May 16, 1939.  J. H. COHEN  2,158,674
WINDSHIELD HEATER
Filed Nov. 2, 1936  2 Sheets-Sheet 1
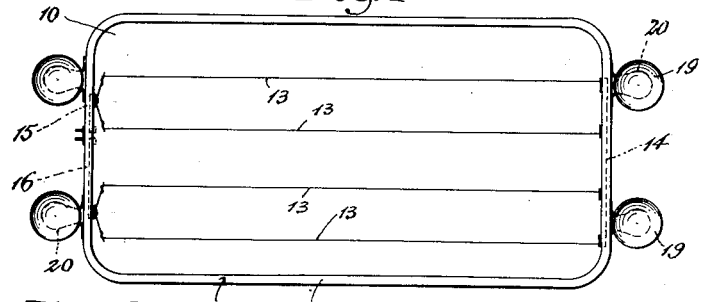
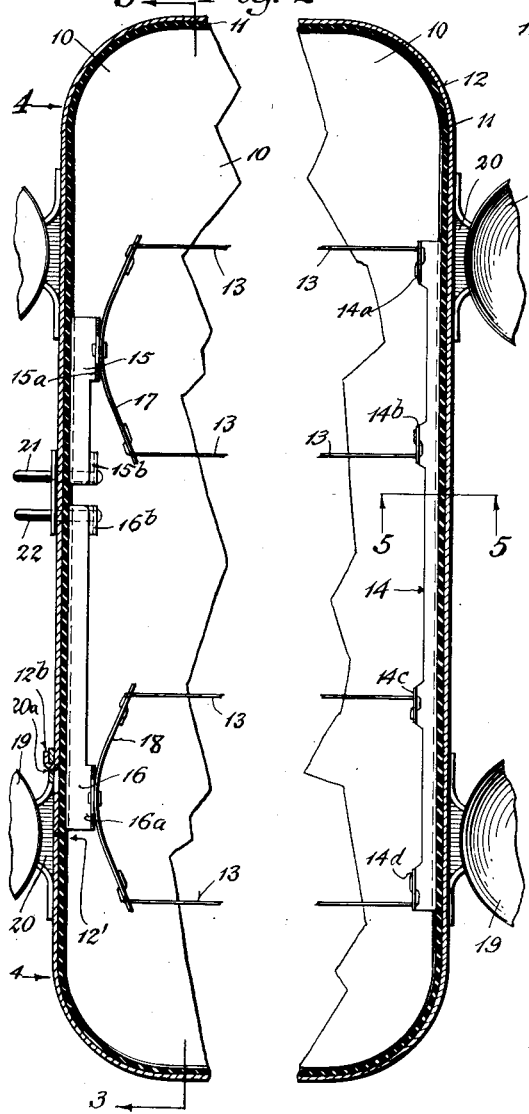
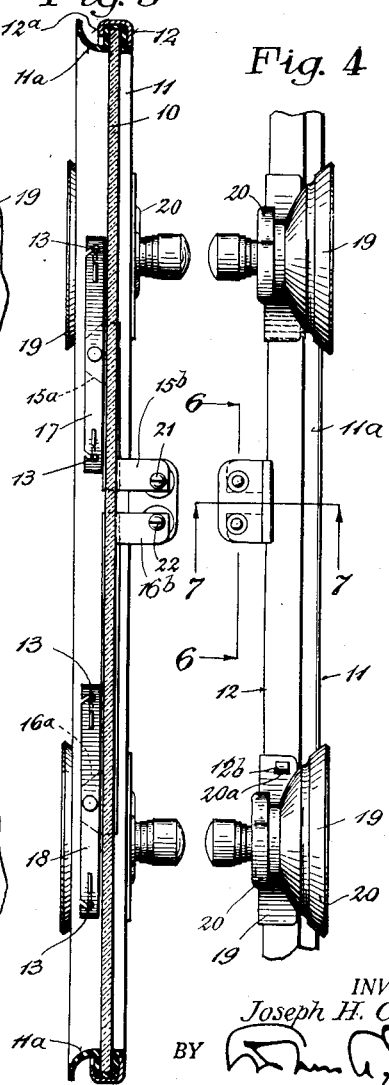
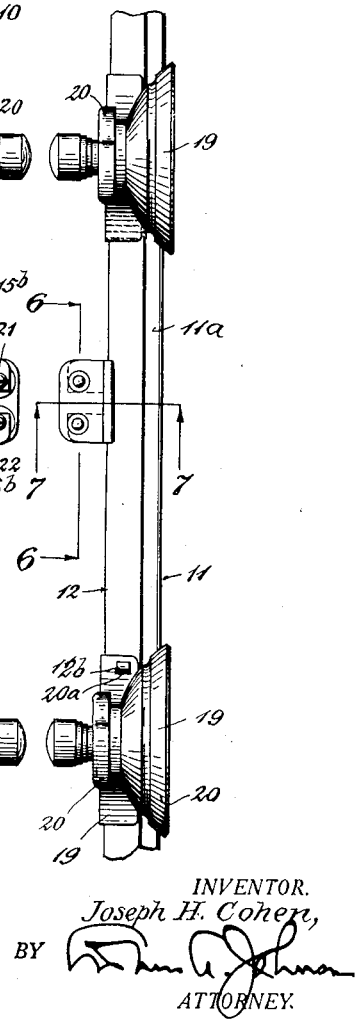
INVENTOR.
Joseph H. Cohen,
BY
ATTORNEY.

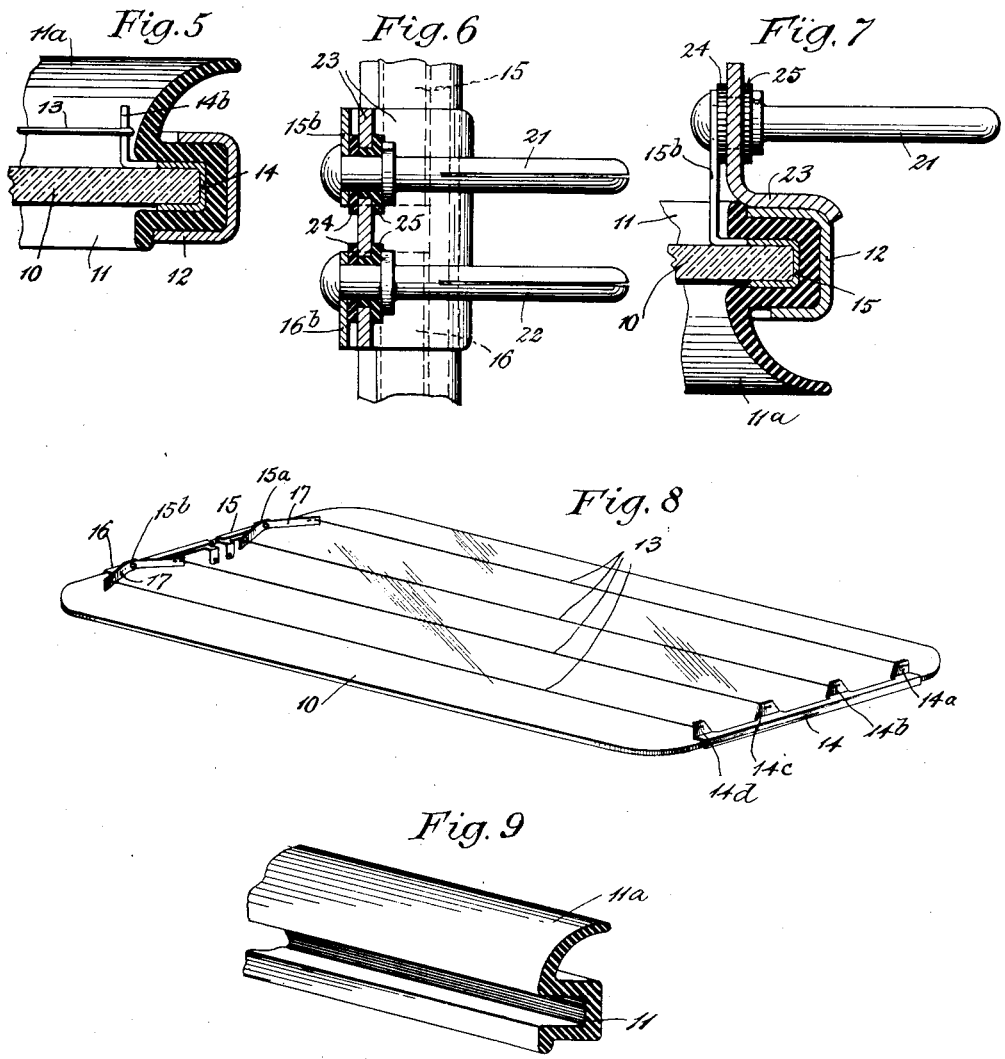

Patented May 16, 1939

2,158,674

UNITED STATES PATENT OFFICE 2,158,674

WINDSHIELD HEATER

Joseph H. Cohen, Bridgeport, Conn., assignor to Casco Products Corporation, Bridgeport, Conn., a corporation of Connecticut Application November 2, 1936, Serial No. 108,702

2 Claims. (Cl. 20—40.5)

This invention relates to windshield heaters and defrosters of the type including a transparent plate and a framing structure therefor, these parts forming a shallow box to establish a more or less tightly closed air space between the device and the windshield glass on which the device is mounted.

A feature of the present invention is a shaping of the channel of the metal frame, so that a channeled liner of soft material, desirably in the form of a soft flexible rubber strip, can be interposed between the glass plate and metal frame and in such manner that both channels will overlap said plate over both of the opposite faces thereof.

Another feature of the invention is the provision of electrical heating means including resistance wires strung across the glass plate in the usual way, yet adapted to be completely mounted in place on the device before the metal strip is brought into the assembly. These wires can be and desirably are hung from small sheet metal clasps or clips adapted to be sleeved onto the two oppositely located edges of the glass plate and insulated from the frame by the rubber liner.

A further feature of the improved mounting means for the glass plate, is that the liner is so formed that the same carries, properly offset from its portion of channel form, a lip or rib running all around the device, to provide a spacing means between the glass plate of the device and the glass of the windshield, as well also as a means for creating in the customary way a partial vacuum in such space, when the heater is mounted on a windshield glass.

The new windshield heater, since its metal framing element can be of very light gauge material, is of reduced weight, and so is particularly adapted to be mounted in place on a windshield glass by suction cups as now favored in the art; such cups being usually carried by metal ears extended from the metal framing of the device and welded thereto.

Another feature of the invention is an initial forming of said channel strip so that when it and the buffer strip are drawn to final shape, so as properly to surround the glass plate, with the marginal portions of the latter snugly tight in the groove of the buffer strip, and with the buffer strip snugly tight in the groove of the metal strip, the meeting or facing ends of the metal strip will be so disposed that one of the cup-mounting ears, when properly located to carry that cup at its appointed position, can be secured by welding to both the ends of the metal strip, and thereby transform the latter into a continuous rigid framing element and at the same time hide such securement or render the same inconspicuous.

These and various other features and advantages of the invention will become apparent hereinafter.

In the accompanying drawings, wherein an embodiment of the invention as at present preferred is illustrated:

Figure 1 is a view showing said embodiment in elevation, looking toward the face thereof which is applied against a windshield glass.

Fig. 2 is an enlarged vertical sectional view, taken longitudinally of the device and through the mounting means for the glass plate in a plane containing the grooves in the buffer and metal strips; the suction cups being only fragmentarily shown, and the main central portion of the device being broken away and removed.

Fig. 3 is a transverse vertical sectional view, taken on the line 3—3 of Fig. 2.

Fig. 4 is a fragmentary and elevation view, looking in the direction of the arrows 4—4 of Fig. 2.

Fig. 5 is a detail view, on a very much enlarged scale, being a horizontal section taken on the line 5—5 of Fig. 2.

Fig. 6 is a similar view, being a section taken on the line 6—6 of Fig. 4.

Fig. 7 is a similar view, being a section taken on the line 7—7 of Fig. 4.

Fig. 8 is a perspective view, showing the glass plate with a suitable heating means mounted thereon.

Fig. 9 illustrates a now preferred form of liner, fragmentarily, and in perspective.

The device of the present invention, in the exemplifying embodiment thereof illustrated in the drawing, is shown as comprising a glass plate 10, mounted in a framing means including a soft rubber buffer, liner and sealer 11, and an outer metal frame 12.

This liner 11 is of constant cross-section throughout its length, as is the metal frame 12, (see Fig. 5).

The metal frame is of channel form, and desirably is of very light gauge metal, so that, despite its U-shaped cross-section, it can not only be readily longitudinally curved or bent to agree with the outline of the glass plate 10, which latter is here shown as oblong with rounded corners, but it can be easily sprung away from and bent back to conformity with the outline of the glass plate. Thus the frame can either be made to final shape, or to approximately final shape, and applied as the outermost element of the framing means for the glass plate, being first, if required, slightly deformed, but always finally being forced to its final shaping in bringing it properly in place about the glass plate.

The frame 12 is desirably a cut-off subdivision of a channel strip; such subdivision being of a length and so longitudinally curved or bent that when brought to final position about the glass plate, the ends of said subdivision will meet or closely approach each other at or near any predetermined point around the periphery of the glass plate, as, for instance, at the point marked 12' in Fig. 2.

The liner 11 has a main portion which is desirably, as here shown, of true U-shape in cross-section, that is, with both legs of the U of the same length. This main portion of the liner 11 provides a continuous groove all along the length of the liner, for snugly enclosing the edges and edge marginal portions of the glass plate. The liner 11, like the metal frame 12, desirably is a mere cut-off length of a strip of the required cross-section; just long enough to be wrapped around the glass plate 10, and to have the opposite ends thereof meet at some point around the periphery of the glass plate.

Liner 11 is shown as so shaped transversely as also to include an offset sealing rib or lip 11a, adapted, when the heater is mounted on a windshield glass, to coact with the latter, and with the framing 11—12 and the glass plate 10, to provide a more or less sealed air space between the glass 10 and the windshield glass. It will be noted that the metal frame 12, of U-shaped cross-section as aforesaid, is shown as having one of the legs of the U somewhat shorter in length than the other. This shortened leg, marked 12a in Figs. 3, 5 and 7, gives maximum freedom of flexure to the root portion of the lip 11a.

Before the liner 11 is applied to the glass 10, the electrical heating means is mounted on such glass 10. As here shown such means includes four electrical resistance wires 13, two strung between thin sheet metal clasps or clips 14 and 15, and the other two strung between said clip 14 and another clip 16 generally similar to the clip 15. The clip 14 is placed on one edge of the glass 10, and the clips 15 and 16 are placed on an opposite edge of the glass. Each of these clips has a main body of U-shaped cross-section, this body for embracing the edge of the glass 10 on which the clip is positioned as well also as the portions of the opposite faces of the glass marginal to said edge. Offset from the U legs of these clips which are at the side of the glass 10 to face toward the windshield glass when the heater is mounted thereon, are, as seen best from Figs. 2 and 5, upstanding extensions 14a, 14b, 14c and 14d, these on the clip 14, and similarly upstanding extensions 15a and 16a, these, respectively, on the clips 15 and 16.

A leaf spring 17 is secured at a point midway along its length to the extension 15a; and between the two ends of this leaf spring and the extensions 14a and 14b of the clip 14 are strung two of the wires 13. A similar spring 18 is similarly secured to the extension 16a; and between the two ends of this leaf spring and the extensions 14c and 14d of the clip 14 are strung the other two wires 13.

The leaf springs 17 and 18 act as tensioning and tautening means for the wires 13. With four wires thus connected to the clips, these wires are adapted for series parallel energization, which is now preferred, but not essential.

When the frame 12 is finally secured in place around the glass plate 10, this plate, gripped shock-absorbingly by the soft liner 11, is positively held in place within the framing structure, because not only do the opposite sides of the channel in the liner extend over the opposite faces of the glass plate, but the opposite sides of the channel in the metal frame 12 so extend.

After the clips 14, 15 and 16, with or without the wires 13, have been engaged with the glass plate 10, the framing for the device is applied. If merely the clips are applied to the glass plate 10 before said framing is applied, the wires 13 can be mounted in place on the clips at any time during the assembly of the heater. The frame for the device is added by fitting the channel in the liner 11 about the edges and marginal portions of the glass plate 10 and forcing the metal frame 12 to tight fit around the glass plate with the channel of the frame embracingly receiving the main body of the liner 11 which carries the channel for embracingly receiving the marginal portions of the glass plate. In thus applying these parts 11 and 12, first the liner 11 can be applied to the glass plate, and next the frame 12 can be applied to the liner 11, as already explained; or first the liner 11 can be placed in the frame 12, and then these two parts as one can be applied to the glass plate.

A plurality of suction cups 19, here four in number, are shown as mounted in the usual way on ears 20 offset from and welded to the metal frame 12 at suitable points around the same.

One of these ears, that shown to the lower left in Fig. 2, and at the bottom of Fig. 4, is placed overlappingly of the point 12' where the ends of the metal frame meet. This ear is welded to both said ends. One of these ends has a struck-out and curled-back tongue or hook 12b, and the ear 20 last referred to, at one side thereof, is slotted at 20a to take the hook 12b.

This provision makes it very easy to join together the opposite ends of the metal frame, incidental to mounting one of the ears properly in place; as, following the final bending-in of the frame 12 to the final shape it is to have, and the proper engagement of the hook 12b with the slot in said ear, the latter can be drawn tight against the hook to hold or force the frame, or assist in holding or forcing the frame, to the final shape it is to have, and at the same time to locate the ear for proper securement to the frame by welding and permanently lock the frame in that shape.

At any stage during the manufacture of the heater, but preferably after the ear engaged with the hook 12b has been welded in place, the other ears 20 are secured, also by welding, to the frame 12.

The clips 14, 15 and 16, or any equivalent fitments for mounting the resistance elements of the heating means, are easily and quickly applicable to the glass plate 10, even though applied independently of the wires 13; as by making such clips or the like of spring metal so bent and resiliently biased as frictionally to seize the glass plate in the positions thereon at which the clips are adjusted. When these clips or the like are strung with the heating wires before the clips are attached to the glass plate, such attachment can be done also easily and quickly. For instance, the clips can be applied to the opposite edges of the glass plate first by endwise approach of the clips toward said edges and then by endwise sliding of the clips along said edges until the wires are positioned exactly as intended.

A pair of split post terminals 21 and 22 for supplying current to the wires 13 are shown as connected to each of the clips 15 and 16 by way of fingers integral with the latter. These fingers as shown are offset from their clips to extend away from that side of the glass 10 which is remote from the side thereof adjacent to which the wires 13 are strung. The terminal 21 is secured to that one of these fingers, marked 15b, offset from the clip 15, and the terminal 22 is secured to that one of these fingers, marked 16b, offset from the clip 16. It will be noted that these terminals have collars intermediate their lengths, so that they can be secured in place merely by riveting over their inner ends as shown. Before being thus secured, the terminals 21 and 22 are passed, at their basal portions beyond their collars, not only through apertures in the fingers 15b and 15c, but also through apertures in metal strap 23. This strap is shown, most clearly in Fig. 7, as bent to L-shape, so that it will present an extension which can be flatwisely laid against metal frame 12, and welded thereto at the proper and an inconspicuous location to lock the wire-mounting clips 15 and 16 positively in place relative to the glass 10. In order to prevent the metal strap 23 from short-circuiting the terminals 21 and 22, the strap, as best shown in Fig. 6, is insulated from both the terminal-carrying fingers 15b and 16b, by washers 24 and sleeves 25 of fibre or other suitable insulating material.

Once the frame 12 has been given its final shape around the glass 10 and has been made a permanently continuous frame by welding in place the ear 20 which is to cover the meeting ends of the frame, the frictional grip of liner 11 on the clips 14, 15 and 16 will hold them and consequently the wires 13 to their predetermined dispositions. The strap 23 or an equivalent affords, however, complete and absolute insurance that after final assembly of the heater there will be no relative shifting between the clips 15 and 16, and therefore no possible chance of short-circuiting the wires 13; while the great length of the glass 14 equally insures, although merely frictionally, against any shifting of that clip.

The riveting-over of the inner ends of the terminal studs 21 and 22, so as to incorporate the metal strap 23 as a positive separator for the clips 15 and 16, is now preferred to be done after the frame 12 is united at its meeting ends; although such riveting can be performed at any time during the manufacture of the heater, as during a preliminary sub-assembly of the heating means, or at any stage during the assembly of the heater following mounting of the clips on the glass plate. Where the strap 23 is not secured to the clips 15 and 16 until, following the mounting of these clips and the clip 14 on the glass 10, the framing elements are applied, no trouble need be anticipated from any such accidental relative shifting between the clips 15 and 16 as would later prevent proper application of the strap 23. When the clips are of resilient metal and biased to frictionally grip the parts of the glass plate 10 which they engage, they will maintain the required spacing relative to each other during application of the glass framing means. Furthermore, it would be a very simple matter to secure the clips 14 and 15 temporarily, in any one of various ways (as by the use of a suitable adhesive between the clips and the glass plate, or the attachment of a suitable spacing clamp to the clip extensions 15b and 16b), against relative shifting during application of the frame parts.

Variations and modifications may be made within the scope of this invention, and portions of the improvements may be used without others.

I claim:

1. In a windshield heater, a structure comprising a transparent plate and a carrier therefor; a heating means including a resistance wire extended across said plate and supported by said structure, said carrier being in the form of an enclosing frame for the plate formed of a plurality of internested separate inner and outer longitudinally bendable strips and by reason of such bendability wrapped around the periphery of the plate; and means for connecting the opposite ends of one of said strips to close the frame, said means including a frame extension adapted to carry a suction cup, said extension arranged to overlap the meeting portions of said frame and being in hooked engagement with the frame.

2. In a windshield heater, a structure comprising a transparent plate and a carrier therefor; a heating means including a resistance wire extended across said plate and supported by said structure, said carrier being in the form of an enclosing frame for the plate formed of a plurality of internested separate inner and outer longitudinally bendable strips and by reason of such bendability wrapped around the periphery of the plate; means for connecting the opposite ends of one of said strips to close the frame, said means including a frame extension adapted to carry a suction cup, said extension arranged to overlap the meeting portions of said frame and having an end permanently secured to one of said meeting portions, the opposite end of said extension having an aperture formed therein; and a projection formed on the other meeting portion of the frame adapted to engage the aperture of said extension whereby the frame is removably held to said plate.

JOSEPH H. COHEN.